United States Patent
Kragh et al.

(10) Patent No.: US 8,958,266 B2
(45) Date of Patent: Feb. 17, 2015

(54) ZERO-OFFSET SEISMIC TRACE CONSTRUCTION

(75) Inventors: Julian Edward Kragh, Finchingfield (GB); Johan Olof Anders Robertsson, Grantchester (GB); Everhard Johan Muyzert, Girton (GB); Clement Kostov, Trumpington (GB)

(73) Assignee: Schlumberger Technology Corporation, Cambridge, MA (US)

(*) Notice: Subject to any disclaimer, the term of this patent is extended or adjusted under 35 U.S.C. 154(b) by 1461 days.

(21) Appl. No.: 12/439,099

(22) PCT Filed: Aug. 13, 2007

(86) PCT No.: PCT/GB2007/003073
§ 371 (c)(1),
(2), (4) Date: Jul. 16, 2009

(87) PCT Pub. No.: WO2008/025944
PCT Pub. Date: Mar. 6, 2008

(65) Prior Publication Data
US 2010/0002539 A1    Jan. 7, 2010

(30) Foreign Application Priority Data
Aug. 31, 2006   (GB) .................................. 0617118.5

(51) Int. Cl.
*G01V 1/38*    (2006.01)
*G01V 1/36*    (2006.01)

(52) U.S. Cl.
CPC .............. *G01V 1/3808* (2013.01); *G01V 1/364* (2013.01); *G01V 2210/57* (2013.01)
USPC ........................................................ 367/21

(58) Field of Classification Search
CPC .. G01V 1/364; G01V 1/3808; G01V 2210/57
USPC .................................. 367/21, 23, 56, 24, 144
See application file for complete search history.

(56) References Cited

U.S. PATENT DOCUMENTS

| | | |
|---|---|---|
| 4,476,553 A | 10/1984 | Ziolkowski et al. |
| 4,648,080 A | 3/1987 | Hargreaves |
| 5,247,486 A | 9/1993 | Regnault |

(Continued)

FOREIGN PATENT DOCUMENTS

| | | |
|---|---|---|
| EP | 0066423 B1 | 1/1988 |
| GB | 2172997 A | 10/1986 |

(Continued)

OTHER PUBLICATIONS

Dragoset et al., "Some remarks on surface multiple attenuation," Geophysics, 1998, vol. 63(2): pp. 772-789.
Hale: "Stable explicit depth extrapolation of seismic wavefields," Geophysics, 1991, vol. 56(11): pp. 1770-1777.
Kragh et al., "Source signature estimation—attenuation a the seabottom reflection error from near-field measurements," First Break, 2000, vol. 18(6): pp. 260-264.

(Continued)

*Primary Examiner* — Krystine Breier (57) ABSTRACT

Described are methods for obtaining seismic signals representative of properties of the earth's interior, including the steps of obtaining near-field acoustic signals recorded in the vicinity of a seismic source (13), muting from the near-field acoustic signals at least partly signals representing direct arrivals from the seismic source (13), and using a remaining part of the obtained signals as estimate of a zero-offset data set. The zero-off set data set can then be used to interpolate data from conventional acquisition location, such as streamers (11), to locations closer to the source (13).

17 Claims, 7 Drawing Sheets

(56) References Cited

U.S. PATENT DOCUMENTS

| | | |
|---|---|---|
| 6,446,008 B1 | 9/2002 | Ozbek |
| 6,510,390 B1 | 1/2003 | Bunting et al. |
| 7,440,257 B2 * | 10/2008 | Kirchner et al. ............. 361/502 |
| 7,440,357 B2 * | 10/2008 | Hopperstad ................... 367/41 |
| 2005/0065758 A1 | 3/2005 | Moore |
| 2006/0098529 A1 | 5/2006 | Anderson et al. |
| 2006/0239117 A1 | 10/2006 | Singh et al. |

FOREIGN PATENT DOCUMENTS

| | | |
|---|---|---|
| GB | 2301889 A | 12/1996 |
| GB | 2414299 B | 8/2006 |
| GB | 2433597 B | 5/2008 |
| GB | 2433594 B | 8/2008 |
| WO | 9410585 A1 | 5/1994 |
| WO | 2004068170 A1 | 8/2004 |
| WO | 2005114258 A1 | 12/2005 |

OTHER PUBLICATIONS

Weglein et al., "An inverse-scattering series method for attenuating multiples in seismic reflection data," Geophysics, 1977, vol. 62(6): pp. 1975-1984.

Ziolkowski et al., "The signature of an air gun array: Computation from near-field measurements including interactions," Geophysics, 1982, vol. 47(10): pp. 1413-1421.

Ziolkowski et al., "Marine seismic sources: QC of wavefield computation from near-field pressure measurements," Geophysical Prospecting, 1997, vol. 45(4): pp. 611-639.

Combined Search and Examination Report of British Patent Application Serial No. GB0617118,5, dated Dec. 20, 2006: pp. 1-5.

International Search Report of PCT Application No. PCT/GB2007/003073, dated Nov. 16, 2007: pp. 1-5.

* cited by examiner

ZERO-OFFSET SEISMIC TRACE CONSTRUCTION

The present invention relates to methods of determining a zero-offset seismic data, particularly for marine seismic acquisitions. It relates further to the use of such zero-offset data in the further processing of obtained seismic signals.

BACKGROUND OF THE INVENTION

In seismic exploration it is known to generate seismic pulses or waves from at least one seismic source and to measure or record the produced wavefield using a plurality of seismic receivers. For marine seismic acquisition, the receivers are often arranged as streamers to be towed behind a seismic acquisition vessel. In this way, reflections, interactions or the like of the seismic pulses with earth formations may be analyzed.

In marine seismic acquisition there is typically a distance of over 100 m between the source position and the closest receiver in the seismic streamer. The gap is required because of the complex logistics of towing the sources and receivers. The source to receiver distance results in data or traces missing from the acquisition for the small offsets between source and nearest receivers in the acquired seismic data records. Currently these small and zero-offset data can only be estimated through numerical extrapolation methods.

In current acquisition methods there are source configurations known which include seismic receivers mounted on individual airguns. The purpose of these so-called near-field receivers is to acquire signals for estimating the source signature.

In U.S. Pat. No. 4,476,553 and in the European Patent EP 0066423, the entire disclosures of which are incorporated by reference herein, the use of an array of near-field hydrophones or pressure sensors arranged to measure the seismic signals generated by an array of air guns producing seismic signals in a body of water is disclosed. Using the signals obtained by the near-field hydrophones, a synthetic source signal may be derived. This derived synthetic source signal is referred to as a "notional source" and may be used to provide a way of determining the far-field signature of the array of air guns in all angular directions.

As observed by Ziolkowski et al. in: Geophysical Prospecting, 1997, 45, 611-639, and in U.S. Pat. No. 4,476,553, determination of the notional source may be complicated by sea bottom reflections and, as such, accurate marine seismic measurements using the methods described in the patents are confined to deep water seismography.

A variant of the marine seismic source described above is the TRISOR™ source used by WesternGeco Ltd. In the TRISOR™ source, a TRISOR™ marine source controller enables the air gun elements to be synchronized so as to enhance the primary pulse (peak-tuning), or the first bubble (bubble-tuning) or any other part of the composite air gun signature. TRISOR™ also allows acquisition of data from a hydrophone located near to each air gun element. Although commonly referred to as near-field hydrophones (NFH), the trace from each hydrophone is actually in the far-field of the acoustic pressure radiated from the air gun.

In U.S. Pat. No. 4,648,080 the far-field signatures of marine source arrays are determined by the downward continuation of near-field data recorded along a short signature streamer of closely spaced hydrophones, located beneath the array. A similar method is disclosed in the international published patent application WO 9410585 A1.

Other inventions, such as described in U.S. Pat. No. 5,247,486, describe methods for determining a far-field signature of a plurality of seismic source elements by measuring a near-field signature of each seismic source element and interpolating a relationship between the measured near-field signature and a measured far field signature. As disclosed, an initial near-field signature of each seismic source element and an initial far-field signature of the plurality of N seismic source elements are measured simultaneously and an operator is determined from the measurements to calculate subsequent far-field signatures. Similarly, WO-2004068170-A1 discloses a method and apparatus for directional de-signature of a seismic signal. The method includes forming a plurality of far-field signatures representative of a plurality of seismic signals having a plurality of take-off angles, associating a plurality of traces representative of a plurality of reflections of the seismic signals with the plurality of far-field signatures, and forming a plurality of de-signatured traces from the plurality of traces and the plurality of associated far-field signatures.

Further attempts to improve the source-signature estimation are described by Ed Kragh et al in First Break 18, No. 6, 260-264 (June 2000). The authors suggest to subtract an estimate of the sea-bottom reflection of the source-energy from the near-field measurements and then performing the far-field estimation using the Notional Source method in the known manner.

SUMMARY OF THE INVENTION

According to an aspect of the invention there is described a method of obtaining seismic signals representative of properties of the earth's interior, including the steps of obtaining near-field acoustic signals recorded in the vicinity of a seismic source; and using a remaining part of the obtained signals as estimate of a zero-offset data set.

Seismic signals in accordance with the present invention includes signals generated using a man-made source triggered at pre-determined times. It includes such signals in the various states of recording, processing or storage.

Locations in the immediate vicinity of the source or integrated with the source array are referred to as near-field. In the present invention locations within a distance of two or more preferably one characteristic length of the source or source array are considered to be near-field. Hence, in an example where the source array has a spread of 18 m, a near-field location could be with 18 m from the periphery of the source array.

Seismic receiver includes any form of receiver designed to acquire seismic signals, in particular acoustic signals between 0 and 500 Hz, and even more particularly between 0 and 300 Hz. Such receivers include geophones and more preferably hydrophones, both known as such.

Near-field receivers are receivers at a near-field location or receivers towed using the same towing lines as the source.

A preferred embodiment of the invention includes the step of muting, isolating or removing from said near-field acoustic signals at least partly signals representing direct arrivals from the seismic source, such that the these parts of the near-field signal are effectively ignored or cancelled from the further use of the near-field data. Direct arrivals include signals which travel directly from their point of origin to the recording receivers without having undergone a reflection or refraction.

A zero-offset data set is understood as a representation of a seismic signal associated with one location. A data set can for example be a trace or subsets thereof and it can be represented in any form, including a digitized form, accessible to processing such as signal processing or filtering.

A zero-offset data set is understood as a data set acquired at a near-field location. Zero-offset data sets include data sets having the same location as the source position or the nominal source position as the source array has finite length and width.

It is advantageous for the zero-offset data set to be essentially of at least the same length as the data set acquired at non-zero offsets, e.g. at receiver locations within a streamer. The length can be measured as number of data points or simply in time units. However depending on the purpose or use of the data set it length may be shorter. In practice the preferred time length of the data set exceeds 1 second, more preferably 2 seconds or even 10 seconds.

In a preferred embodiment of the above aspects of the invention the remaining part of the obtained signals is deconvolved with a far-field source signature. As a preferred result of this operation the effect of the source characteristic on remaining part of the obtained signals is essentially removed, thus matching the resulting zero-offset data set closer with the other data sets in the seismic processing chain.

To further improve this matching the remaining part of the obtained signals is preferably shaped in a signal processing step such that characteristics of the near-field receivers are matched with characteristics of receivers used to obtained non-zero-offset data sets. Such characteristics include for example the amplitude or the amplification applied to the received signals, the impulse response of the respective receivers, the sampling rate used and other receiver characteristic or any combinations thereof.

According to a further aspect of the invention a zero-offset data set is determined together with its first order or high-order spatial derivatives.

According to another aspect of the invention the zero-offset data set is used to improve the extrapolation of data sets from other locations or enable an interpolation of data between the zero-offset data set and non-zero-offset data sets. Though such interpolations can be performed without derivatives of the seismic signal, it was found that the interpolation can be improved by the use of the derivatives of the zero-offset data set.

According to another aspect of the invention extrapolation is used to extrapolate zero-offset data set and non-zero-offset data sets to an equal depth. This step facilitates subsequent processing of seismic data sets which include both, zero-offset and other seismic data sets or traces. The zero-offset data set and non-zero data sets are preferable combined and processed together to generate a representation of the interior of the earth.

It may also be beneficial to compare the zero-offset data set derived using any of the above with zero-offset data set derived though any other known method such as stacking, DMO-stacking or other processing methods.

According to another aspect of the invention the new method of processing data includes the step of generating a representation of the interior of the earth using data sets derived from the steps of obtaining near-field acoustic signals recorded in the vicinity of a seismic source; and using a remaining part of the obtained signals as estimate of a zero-offset data set. Preferably, this method includes the muting from said near-field acoustic signals at least partly signals representing direct arrivals from the seismic source. In a further preferred embodiment, this method includes the use of data derived by interpolating between the zero-offset trace and other traces from the same or other seismic shots.

BRIEF DESCRIPTION OF THE DRAWINGS

The present invention will become more fully understood from the detailed description and the accompanying drawings, wherein.

DETAILED DESCRIPTION

In the following description, for the purposes of explanation, specific details are set forth in order to provide a thorough understanding of the invention. However, it will be apparent that the invention may be practiced without these specific details.

Figure 1A:
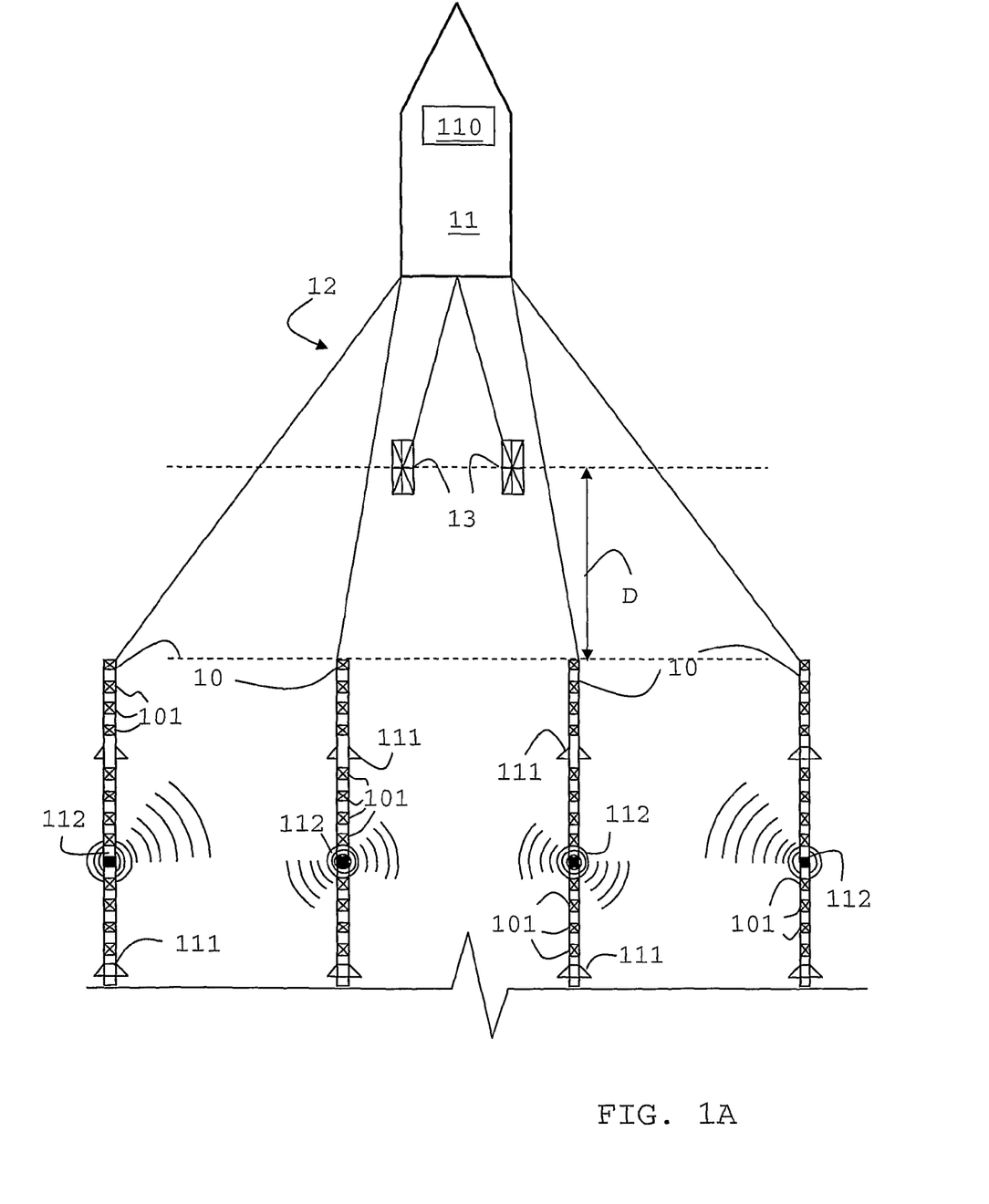
FIGS. 1A-1C provide a schematic illustration of equipment for seismic data acquisition in a marine environment, which may be used in an example of the present invention.

FIG. 1A depicts a typical marine seismic acquisition system; such a marine seismic acquisition system may be used in embodiments of the present invention. As depicted, four instrumented cables or streamers 10 are towed by a ship 11. A front network 12 and similar tail network (not shown) is used to connect the vessel and the streamers. Embedded in the front network is a seismic source 13, typically an array of air guns. Each air gun is accompanied by a hydrophone (as shown in FIG. 1C, below).

Each streamer 10 is typically assembled from many hydrophone holder segments carrying hydrophones 101. Between segments, the streamers carry controllable deflectors 111 (often referred to as vanes or "birds") and other aids for steering the streamer along a desired trajectory in a body of water.

The accurate positioning of modern streamers is controlled by a satellite-based positioning system, such as GPS or differential GPS, with GPS receivers at the front and tail of the streamer. In addition to GPS based positioning, it is known to monitor the relative positions of streamers and sections of streamers through a network of sonic transceivers 112 that transmit and receive acoustic or sonar signals.

Figure 1B:
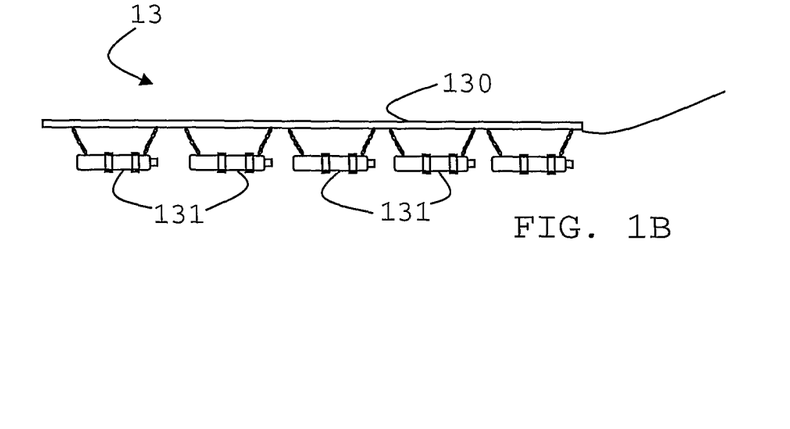
Figure 1C:
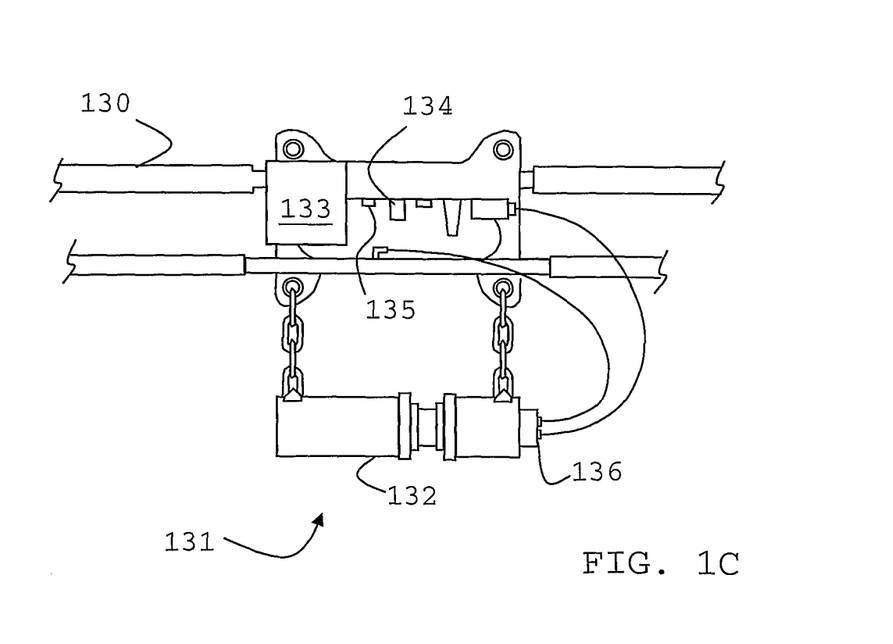

In FIGS. 1B-1C the marine source 13 is shown in greater detail. The seismic survey vessel 11 tows a marine source 13 which typically includes a suspension system 130 carrying a plurality of air guns 131, which generate superposed acoustic waves (not shown) in the water that travel in all directions including both towards the sea-floor and towards the sea-surface (also not shown), from which such waves are reflected down again, creating so-called ghosts of each air gun source. Removal of these ghost images from a received signal is important for accurate seismic analysis.

In FIG. 1C a single air gun 131 is shown in greater detail. The air gun is a calibrated marine source with a body 132 made of a Bolt-type air gun. The suspension system 130 includes data transmission cables. The air gun body 132 is connected to a data digitizer and source controller 133.

Within the source array, receivers such as the near-field hydrophone 134 are used to capture transient pressure information to estimate the notional source signature. It is known to use the plurality of near-field hydrophones to compute a plurality of notional source signatures. Knowledge of the notional source signatures is, in turn, used to calculate far-field signatures in any desired direction such as the far-field signatures for a plurality of vertical polar angles.

Information about location of a sea-floor relative to the sea-surface may be obtained from a depth sensor 135 and additional information may be obtained from a gun sensor 136.

As illustrated, the seismic sources 13 may be air guns or clusters of air guns. However, the present invention is not so limited. In alternative embodiments, the seismic sources 13 may be any device capable of generating the desired acoustic wave, such as piezoelectric devices, cavitational water guns and/or the like.

In operation, the seismic sources 13 may impart an acoustic wave through the water and into the sea-floor. The acoustic wave reflects and refracts from various structures (also not shown) within the sea-bed and above the sea-floor. The reflected and/or refracted wave (also not shown) is detected by the receivers 101 in the streamer 10 as seismic data, wherein each temporal sequence of signals received by a receiver in the streamer is often referred to as trace.

The present invention addresses a problem visible from the FIG. 1A. In FIG. 1A it is apparent that the receivers 101 nearest to the source 13 are still separated from it by at least a distance D as shown. Even though it is an objective to tow the streamer as close as possible to the source, it has so far proven difficult to reduce the distance D to less than about 100 meters.

To close this gap for a seismic survey, the recorded traces can be extrapolated. However certain assumptions about the earth properties such as moveout parameters, dip orientation etc. have to be made either explicitly or implicitly to perform an extrapolation. It is clearly more advantageous to determine one or more data sets along the length of D to improve the extrapolation and thus to replace the extrapolation by an interpolation.

An interpolation can be for example based on knowledge of a zero-offset or near zero-offset data set. Such a data set represents part or all of the recordings of a seismic wavefield which generated by the source has traveled through the interior of the earth and is recorded in the immediate vicinity of the source 13.

According Kragh et al. a stacking procedure, a beamformer, an f-k filter or any other method that filters the near-field hydrophone signals such that signals from a range of target directions can be used to give an estimate of the sea-bottom reflection. It is now found that the methods proposed by Kragh et al. above for the purpose of estimating the sea-bottom reflection can also be used to determine an initial or raw estimate of a zero-offset data set or trace by isolating said signal and preserving it rather than subtracting it from the near-field measurement.

In the processes of stacking the measurements of several near-field receivers are added thus attenuating incoherent parts of the signals and reinforcing the coherent parts of the signal.

In the process of beamforming as known per se the several near-field receivers are treated as an antenna array and by introducing delays in the signal path the array can be steered to accept signals with a defined propagation characteristics. In beamforming, both the amplitude and phase of each antenna element can be controlled. Combined amplitude and phase control can be used to adjust side lobe levels and steer nulls better than can be achieved by phase control alone. The combined relative amplitude and phase shift for each antenna is usually called a complex weight. The signal of each receiver is weighted with either a pure delay or phase weight or with a complex weight.

In digital beamforming, the operations of phase shifting and amplitude scaling for each antenna element, and summation for receiving, are done digitally.

Adaptive beamforming is the process of altering the complex weights on-the-fly to maximize the quality of the communication channel. In radio signal processing the criteria for the calculation of the weight can be the minimum mean-square error, the maximum signal-to-interference ratio or the minimum variance. Often, constraints are placed on the adaptive beamformer so that the complex weights do not vary randomly in poor signal conditions.

A particularly suitable method for the purpose of the present invention is a variant of the methods relating to filtering coherent noise and interference from seismic data by constrained adaptive beamforming as described in the U.S. Pat. No. 6,446,008 incorporated herein for the purpose of providing a detailed description for designing the filter for the signals obtained by the near-field receivers. The method includes using a constraint design methodology which allows the imposition of an arbitrary predesigned quiescent response on the beamformer. The method also makes sure that the beamformer response in selected regions of the frequency-wavenumber space is entirely controlled by this quiescent response, hence ensuring signal preservation and robustness to perturbations. This method further includes regularization to increase the stability of the filter weight calculation.

However in contrast to U.S. Pat. No. 6,446,008, the method is used for the purpose of the present invention not to attenuate coherent noise and interference from the seismic signal but to extract from the near-field measurements an estimate or approximation of the zero-offset trace.

For example the near-field effects of the source can be further removed by knowing the onset of the zero-offset trace. Auto-correlation of the isolated trace enables an estimate the water-layer reverberation period and hence water layer depth and therefore zero-offset onset time at the source position. Details of such a procedure are described for example in the United Kingdom patent application "Methods ands Systems for Determining Signatures for Marine Seismic Arrays for Seismic Analysis", filed as application no. GB-0526280.3 on 23 Dec. 2005.

As shown in FIG. 1A, a signal processing unit 110 may be provided to process or filter the analogue and/or digital signals that are generated by the receivers and the source data in accordance with the above example of the present invention. The signal processing unit 110 may comprise a data collection unit (not shown) and a data processing unit (also not shown). The signal processing unit 110 may be deployed on the seismic survey vessel 11. However, it will be appreciated by those of ordinary skill in the art that portions of the signal processing unit may be located in any desirable location, including, but not limited to, other vessels (not shown) and on-shore facilities (not shown).

Figure 2A:
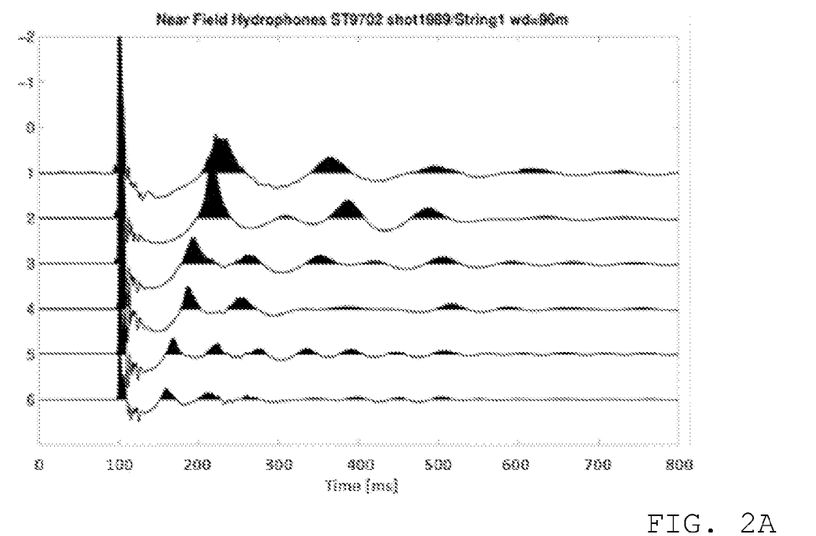
FIGS. 2A-2B illustrate a step of generating a zero-offset trace in accordance with an example of the present invention.

In FIG. 2A, there are shown six near-field hydrophone traces. The recorded energy is dominated by the direct pulse from each airgun followed by the pressure variations from the oscillating airgun bubbles and their reflections from the sea bottom. The zero-offset reflection sequence is just visible starting after the reflection from the sea bottom.

Figure 2B:
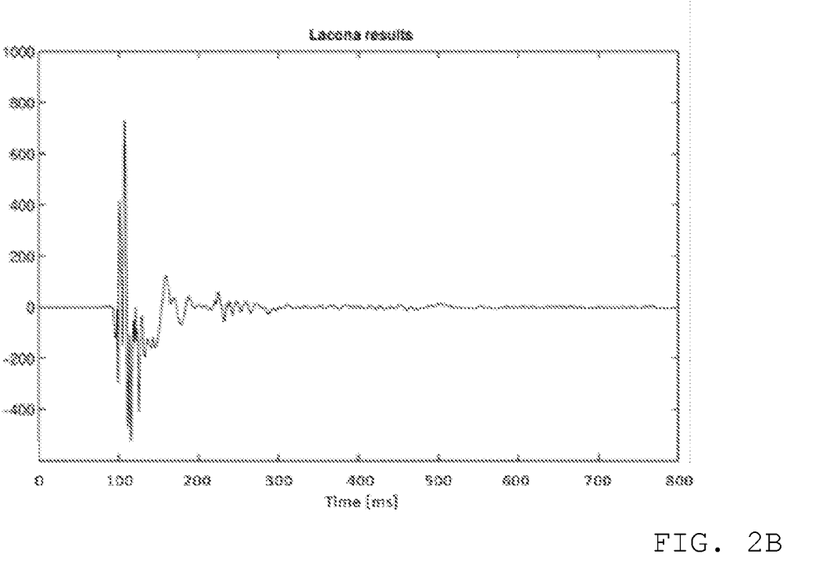

An adaptive beamforming operation using for example a filter design as described in U.S. Pat. No. 6,446,008 modified to preserve on the signal with zero moveout or with vertical or near-vertical incidence is applied to the recorded data sets. As a result a trace as shown in FIG. 2B can be isolated from the near-field signals. This process greatly enhances the zero-offset reflection data set. The signal energy prior to the arrival of the sea-bottom reflection of the source signals are muted.

The data set of the example is limited to 800 ms. However for an accurate interpolation the time window or length of the data set is longer than at least 1 s. By allowing for longer recording time the near-field hydrophones of the above example can record data for 1 s, 2 s or even longer than 10 s. The upper limit of the recording time is a function of the hardware and storage capacity of the equipment. Such upper limits may be set to 10 s, 15 s, 20 s or even 30 s and higher.

Having isolated an initial or raw approximation of a zero-offset data set by using the beamformer, further processing steps are used to remove the near-field effects of the source from the data set and to match the zero-offset data to the data as obtained by the receivers with a larger off-set.

A further step includes the step of compensating for a different response characteristic between the receivers used to capture the near-field and the receivers used to capture the seismic data sets for the conventional offset location. Whereas receivers in the streamer are usually built in accordance with an identical specification, near-field sensor are built to withstand a higher signal amplitude. As mentioned above those near-field sensors which are designed to monitor the source signature are usually operating at a higher sampling rate. These different responses can be compensated for by use of signal processing, more specifically by signal shaping and resampling.

In signal shaping the response or impulse function of one type of receiver $r1(f)$ is converted into a function $c(f)r1(f)$ using the compensation filter $c(f)$. The multiplied function $c(f)r1(f)$ equals the response function $r2(f)$ of the second type of receiver. In the described generality the compensation function can compensate for receiver characteristics such as sensitivity, phase shifts, amplification etc., all of which can be also dealt with separately.

In the resampling step sampling points (times) of zero-offset data set and those of the other data sets are chosen to coincide. It should be noted that this step can include or be replaced by an interpolation. The step can also include band-limiting the frequency band of the zero-offset data set to match the frequency band of the other conventionally obtained data sets.

After the matching step the zero-offset trace is processed to remove the effect of the far-field signature of the source from the data set. Using for example source deconvolution, the signature of the seismic source in the seismic trace is changed to a known, shorter waveform by using knowledge of the source waveform.

The far-field signature can be estimated using for example the variants of the Notional Source method as described in the introductory part of this specification. Another variant believed to result in a more accurate computation of the far-field signature of the seismic source is described in the United Kingdom patent application 0526280.3 filed on 23 Dec. 2005 under the title "Methods and Systems for Signatures for Arrays of Marine Seismic Sources for Seismic Analysis". This patent application is incorporated herein for the purpose of providing an example for a method to establish a representative data set of the Notional Source signature including multiple reflections between sea bottom and sea surface.

In a second example of the invention, a plurality of receivers spread across the source location is used to compute spatial gradients of the pressure recordings in the horizontal and/or vertical directions. Acquiring not only the pressure data at zero-offset but also its horizontal gradient as well as higher order derivatives can be an important additional constraint in interpolating the pressure data to near offsets as described in further detail below.

It should however be noted that in a 1D-earth or line survey, the recorded seismic wavefield has no curvature for vertical incidence. Therefore, the horizontal gradients of the wavefield would vanish at zero-offset. However, for a dipping seafloor, diffractions (such as diffracted multiples), three-dimensional sub-surface structure or data shot using a flip/flop source configurations, the horizontal gradients will not vanish at the source and will provide constraints in the interpolation to short source-receiver offsets.

Figure 3A:
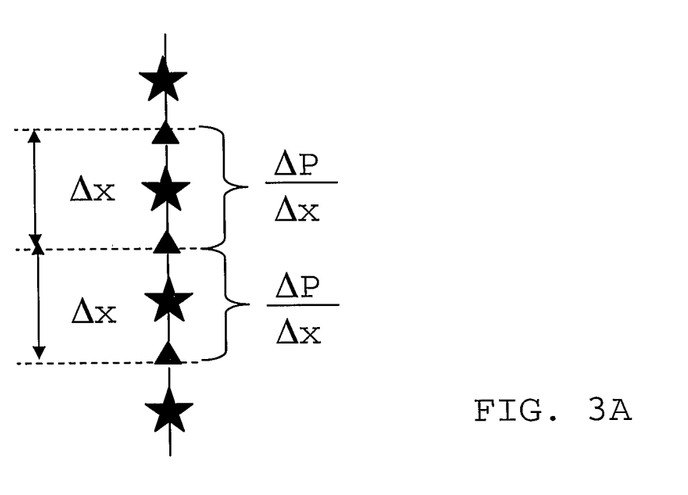
FIGS. 3A-3B illustrate the use of equipment to determine gradient and other derivative information of a wavefield in accordance with examples of the present invention.
Figure 3B:
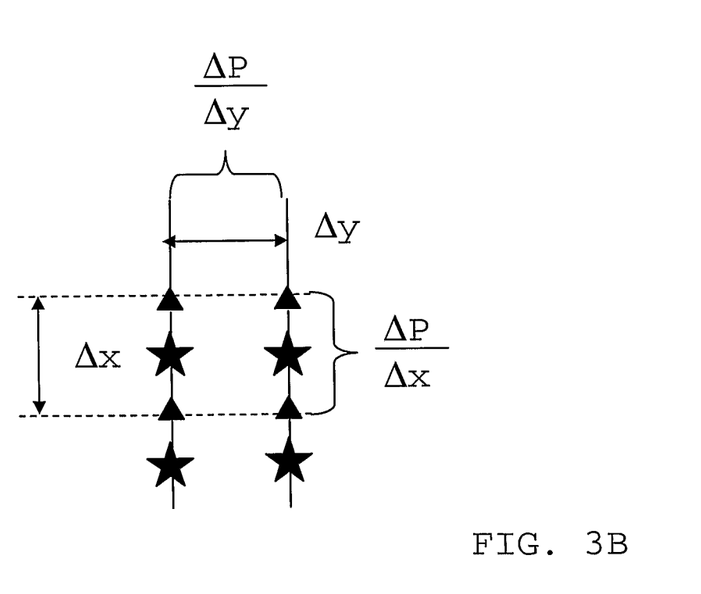
Figure 4A:
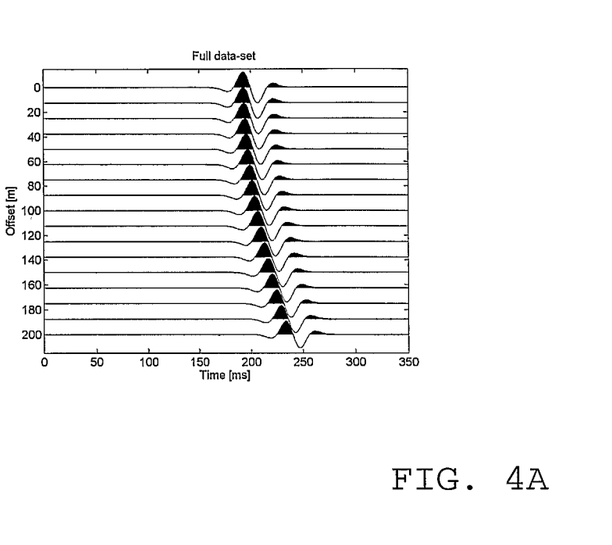
FIGS. 4A-4D provides a comparison of different methods of extrapolation and interpolation, respectively, to illustrates aspects in accordance with examples of the present invention.
Figure 4B:
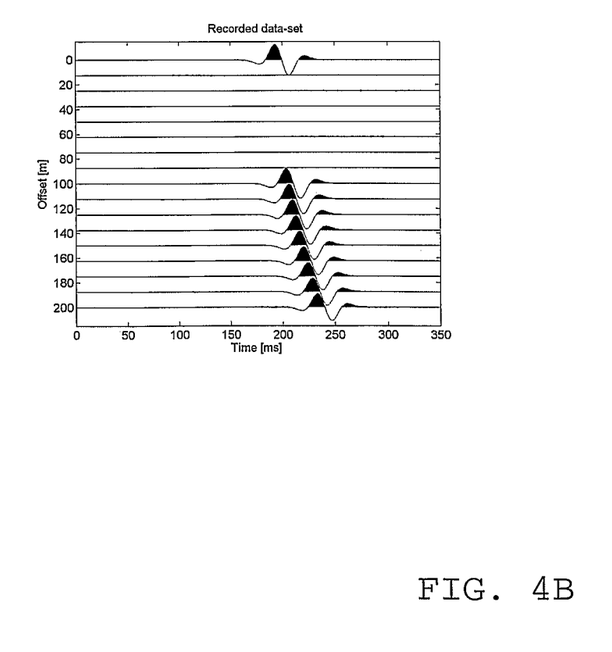
Figure 4C:
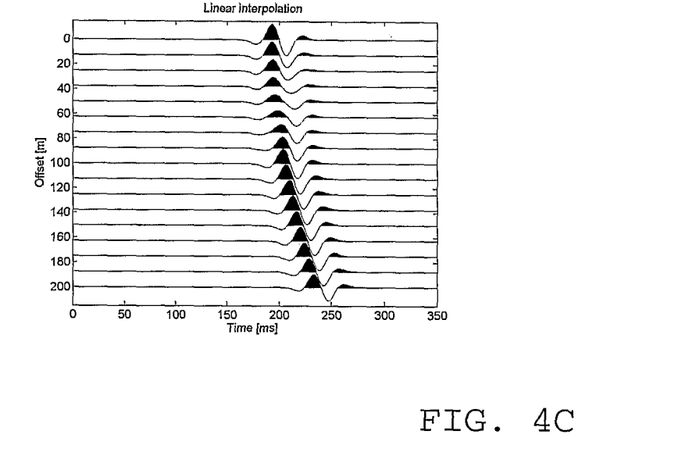
Figure 4D:
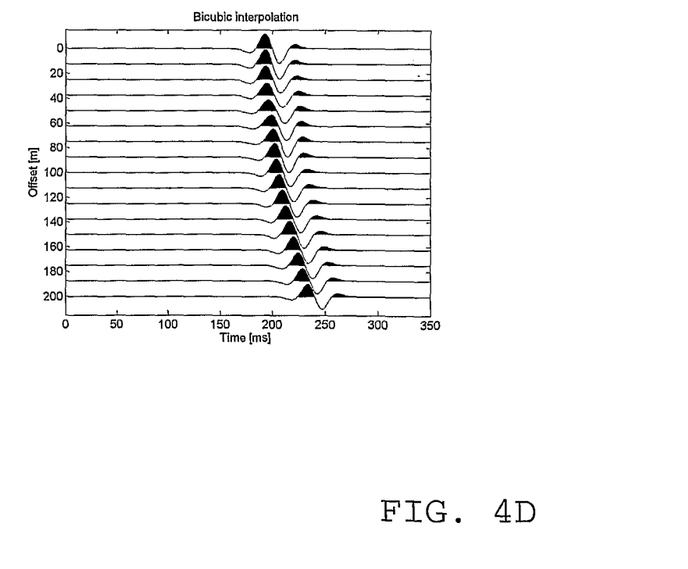

To calculate the approximate inline pressure gradient $\Delta p/\Delta x$, two or more hydrophones are required placed in line with the main or longitudinal axis of the streamer as shown in schematic FIG. 3A. In FIG. 3A the source locations are indicated by stars and the receiver locations by triangles. As in the above example the sources and receivers are essentially co-located with the nearest receiver being at a distance of 0 to 5 meters, in many cases less than 3 meters away from a source. For the present example the distance between associated source-receiver pairs is two meters or less. With three hydrophones distributed in the same horizontal plane but not along a single straight line the first-order derivative can be calculated in the two independent horizontal directions. The hydrophones may be located on two or more airgun sub-arrays. To use even higher order derivatives or more accurate derivative estimations require a larger number of distributed hydrophones over the source array as indicated in FIG. 3B. To estimate a second order derivate in a given direction, one can arrange for example three or more hydrophones along that direction.

To replace or complement hydrophones as receivers other known types of receivers can be used such as accelerometers or geophones which produce an electric signal proportional to a spatial gradient of the seismic wavefield.

In FIG. 3B, a part of a larger array of receivers and airguns are shown. The spread of the array of receivers, i.e. its widest dimension, is between 15 m by 18 m for this example of the invention. The source array can also be composed of both hydrophones and accelerometers to directly record the wavefield and its first spatial gradient.

The near field hydrophone data is filtered twice using a beamformer, first with an output near the vessel, second with an output closer to the streamer. The difference of these filtered traces divided by the distance between the output traces is the desired filtered inline zero-offset gradient trace.

In an alternative example, one or more receivers are located outside a horizontal plane as defined by the other receivers. The out-of-plane receivers enable the calculation of the vertical derivate of the pressure wavefield.

To evaluate the above gradients accurately it is advantageous to further determine the position of the near-field receivers relative to each other, the sea surface and the streamer.

At any of the above stages attempts can be made to interpolate seismic data from the closest position of the conventional receivers to the location of the near-field receiver. With a view on the example illustrated by FIG. 1A, such an interpolation generates data sets to bridge the distance D.

The wavefield interpolation between the near-field and streamer hydrophone data is carried out before deghosting. Alternatively wavefield interpolation may be carried after deghosting: a zero-incidence deghosting method may be applied to the near-field hydrophone data while 2D deghosting is carried out on the streamer hydrophone data.

If the near-field and streamer hydrophones are at different depth levels, the interpolated data will have a ghost gradually changing from the source to the streamer depth depending on the difference in depth. To address this problem the deghosting algorithm can be modified to allow for a varying sea-surface height as both the streamer depth and the depth of the near-field receivers can be measured accurately.

A further wavefield extrapolation, however in vertical direction, can be used to ensure that all data sets whether interpolated using the above methods or directly measured have an equal depth level for the further processing of the seismic data.

A simulated example of the interpolation is shown in FIG. 4. In FIG. 4A the simulated pressure wavefield is plotted at a depth of 6 m under the sea-surface for a reflection from an interface at 150 m depth. Such a data-set would have been recorded if the first hydrophone inside the streamer would have been co-located with the source. In FIG. 4B the zero-offset trace as recorded by the near-field hydrophone is shown and the wavefield that would have recorded by the streamer 100 m offset from the source. FIG. 4C shows the same data-set after linear interpolation between the zero-offset trace and the streamer hydrophone data. The linear interpolation does fill in the gap but not very well. FIG. 4D shows the data-set after bicubic interpolation using the zero-offset trace, its inline gradient and the streamer data that is 100 m offset. Clearly the bicubic interpolation result using the inline gradient trace is superior to the linear interpolation result.

It is likely that in some practical cases, like as this 1D example, the zero-offset pressure gradient trace can be assumed to be zero. This assumption can be incorporated in the interpolation method as a constraint. It has to be noted however that even though the zero-offset pressure gradient can be assumed to be zero, the curvature can be substantial and hence important for an accurate interpolation process.

It was further found that the quality of the interpolation depends on the spectrum of the signal, the offset between the zero-offset and streamer hydrophones and the local dip of the wavefield.

In another application the recorded zero-offset traces are collected and compared to pseudo zero-offset volumes obtained by stack, DMO-stack or other processing methods. This comparison would result in an improved processing parameters and velocity model.

Another further processing step may include depth migrating the recorded zero-offset volume. This step could be performed using computing facilities on board the acquisition vessel or at on-shore data processing centers. The zero-offset trace is also useful in Amplitude Versus Offset (AVO) processing. In AVO processing, parameters such as the zero-offset intercept time, amplitude and gradient are estimated from non zero-offset data. Using the above methods to generate a zero-offset trace, these parameters can be measured directly as the arrival time in the zero-offset trace is equal to the AVO intercept time, and its amplitude is the zero-offset reflectivity.

Figure 5:
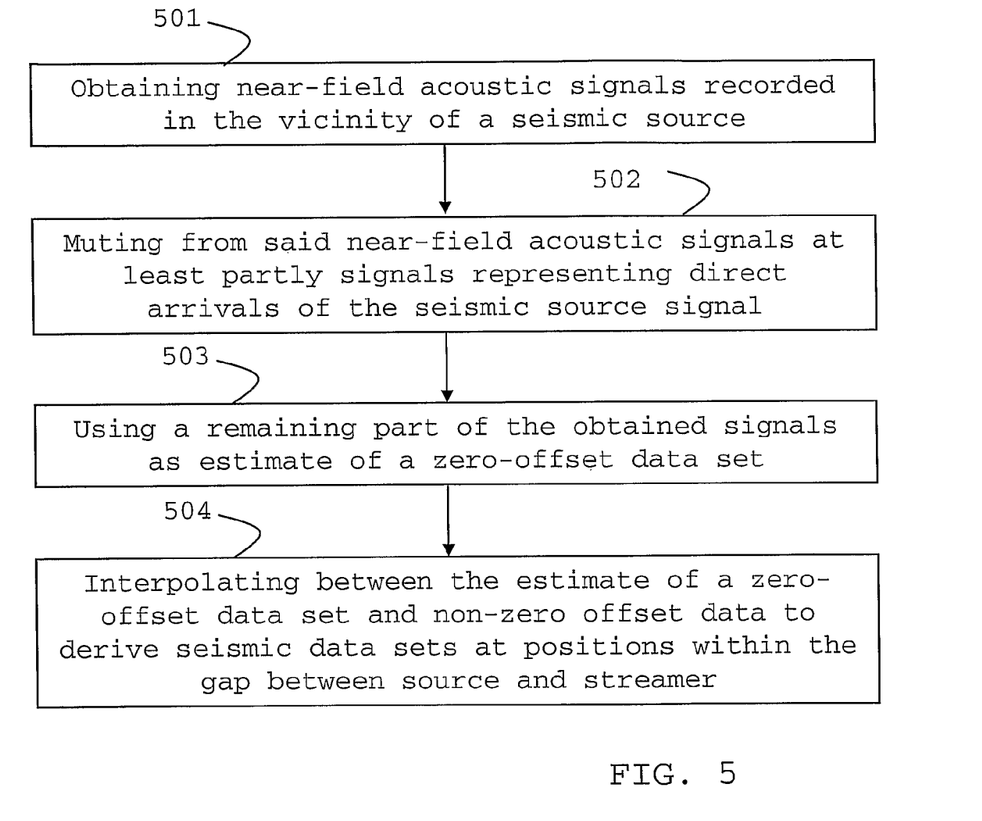
FIG. 5 is a flow-type diagram of steps in accordance with an example of the present invention.

In FIG. 5, steps are illustrated in accordance with an example of the invention. These steps include the step 501 of obtaining near-field acoustic signals recorded in the vicinity of a seismic source. In a further step 502 the near-field signals are treated such that the first arrivals are effectively muted from the near-field signal for the purpose of deriving a zero-offset trace. This muting step may be achieved through time windowing the recorded data, beamforming or any other of the methods described above. In step 503 the muted signal or any further processed variant of it is treated as an estimate of the zero-offset data set of trace. In step 504 an interpolation is performed between the estimate of a zero-offset data set and non-zero offset data to derive seismic data sets at positions within for example the gap between source and streamer.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims. Although specific embodiments of the invention have been described, various modifications, alterations, alternative constructions, and equivalents are also encompassed within the scope of the invention. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators.

The invention claimed is:

1. A method of obtaining seismic signals representative of properties of the earth's interior, including the steps of
    obtaining near-field acoustic signals recorded in the vicinity of a seismic source, wherein the near-field acoustic signals comprise a combination of signals generated by seismic source and seismic signals generated by reflections of the signals generated by the seismic source from a sea bed and sub-surface structures;
    muting at least partly signals representing direct arrivals from the seismic source;
    identifying a zero-offset data set in the obtained near-field acoustic signals, wherein the zero offset data set comprises a remaining part of the obtained near-field acoustic signals after the direct arrivals are removed from the near-field acoustic signals; and
    using the zero-offset data set for at least one of extrapolating data sets from other locations and interpolating data between the zero-offset data set and non-zero-offset data sets.

2. The method of claim 1, wherein the time length of the data set exceeds 1 second.

3. The method of claim 1, wherein the time length of the data set exceeds 2 seconds.

4. The method of claim 1, wherein the identifying a zero-offset data set in the obtained near-field acoustic signals comprises determining an onset of zero-offset data in near-field acoustic signals.

5. The method of claim 1, further including the step of deconvolving the remaining part of the obtained signals with a far-field source signature.

6. The method of claim 1, further including the step of shaping the remaining part of the obtained signals in a signal processing step such that characteristics of the near-field receivers are matched with characteristics of receivers used to obtain non-zero-offset data sets.

7. The method of claim 6, wherein the signal processing step includes amplitude matching to match amplitudes of the near-field receivers to amplitudes of receivers used to obtained non-zero-offset data sets.

8. The method of claim 6, wherein the signal processing step includes matching the impulse response of the near-field receivers to the impulse response of receivers used to obtained non-zero-offset data sets.

9. The method of claim 6, wherein the signal processing step includes matching a sampling rate of the zero-offset data set to a sampling rate of the non-zero-offset data sets.

10. The method of claim 1, further comprising determining spatial derivatives of the near-field acoustic signals.

11. The method of claim 10, further comprising determining gradients of the near-field acoustic signals.

12. The method of claim 1, further comprising the step of using spatial derivatives of the near-field acoustic signals in the interpolation step.

13. The method of claim 12, comprising the step of interpolating data between the zero-offset data set and non-zero-offset data sets and further comprising the step of using first order and/or higher order spatial derivatives in the interpolation step.

14. The method of claim 1, comprising the step of extrapolating zero-offset data set and non-zero-offset data sets to an equal depth.

15. The method of claim 1, comprising the step of processing the zero-offset data set and non-zero data sets to generate a representation of the interior of the earth.

16. The method of claim 1, comprising the step of comparing the zero-offset data set with zero-offset data set derived though methods selected from a group consisting of stack, DMO-stack or other processing methods.

17. The method of claim 1, comprising the step of comparing the zero-offset data set and/or data sets derived through interpolation with data sets derived though methods selected from a group consisting of stack, DMO-stack or other processing methods.

* * * * *